United States Patent [19]

Davis

[11] Patent Number: 4,660,989

[45] Date of Patent: Apr. 28, 1987

[54] AGITATOR SHAFT BOTTOM BEARING ASSEMBLY

[75] Inventor: Charles E. Davis, Mulberry, Fla.

[73] Assignee: CF Industries, Inc., Long Grove, Ill.

[21] Appl. No.: 809,392

[22] Filed: Dec. 16, 1985

[51] Int. Cl.$^4$ .............................................. B01F 7/18
[52] U.S. Cl. ..................................... 366/331; 366/102
[58] Field of Search ............... 366/331, 349, 314, 102; 384/129, 227, 226, 134; 277/3, 135

[56] References Cited

U.S. PATENT DOCUMENTS

| | | | |
|---|---|---|---|
| 1,806,381 | 5/1931 | Baensch | 366/102 X |
| 2,151,146 | 3/1939 | Petry | 366/331 |
| 2,516,918 | 8/1950 | Roubal | 384/134 |
| 2,601,731 | 7/1952 | Trede | 384/134 |
| 2,856,273 | 10/1958 | Beber et al. | 366/102 X |
| 2,928,665 | 3/1960 | Epprecht | 366/102 X |
| 3,489,469 | 1/1970 | Stratienko | 366/331 X |
| 4,565,453 | 1/1986 | Jekat et al. | 384/134 X |

Primary Examiner—Werner H. Schroeder
Assistant Examiner—T. Graveline
Attorney, Agent, or Firm—Trexler, Bushnell, Giangiorgi & Blackstone, Ltd.

[57] ABSTRACT

A baffle for protecting a bottom bearing assembly used as a stabilizer for an agitator shaft operating in a tank-like vessel containing a liquid hostile to bearing components. The baffle defines a pressurized gaseous chamber for isolating the bearing from the liquid in the vessel. Gas under pressure delivered to and maintained in the chamber prevents invasive entry of liquid from the vessel. The apparatus includes an open top bearing-encircling casing which is sealed at its lower end to a bottom wall of the vessel. A pipe in the form of an inverted bucket coaxial with and sleeved over to overlap and encircle an open top of the casing is open at its lower end and is sealed at its upper end to the agitator shaft for rotation therewith. Spaced radially outwardly of an outer wall of the casing, the pipe defines with the casing a restricted annular channel. A conduit connected through the bottom wall of the vessel delivers a supply of gas, under pressure, to fill the casing, the over-sleeved pipe, and the intermediate channel, thus preventing liquid from the vessel from reaching the bearing. Excess gas is slowly discharged at the open lower end of the restricted channel.

4 Claims, 2 Drawing Figures

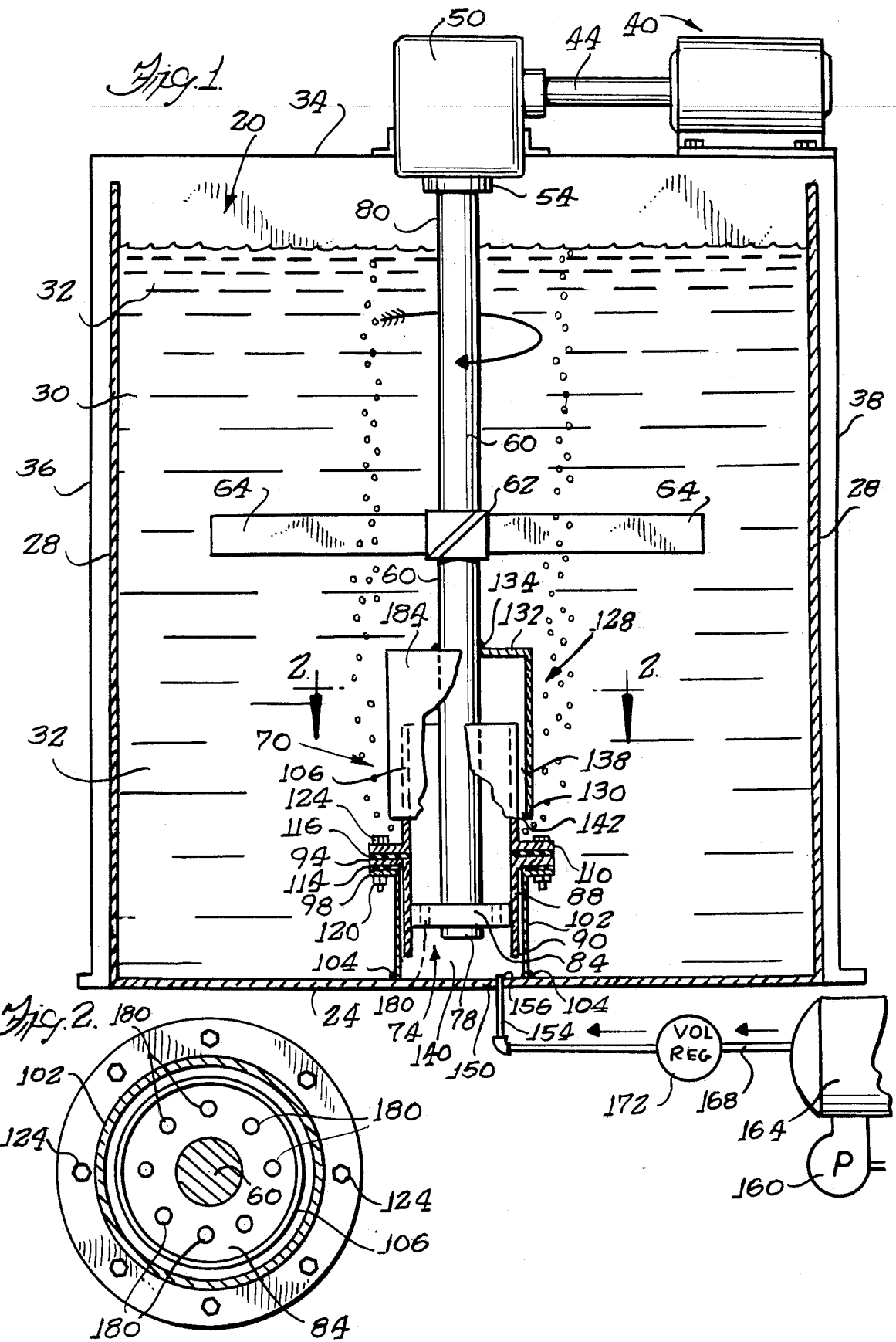

AGITATOR SHAFT BOTTOM BEARING ASSEMBLY

FIELD AND BACKGROUND OF THE INVENTION

The present invention relates to a bearing assembly for stabilizing the lower end of an agitator shaft extending into a mixing chamber of a vessel. More particularly, the invention is directed to a baffle or housing serving to prevent liquid from coming into contact with the shaft-supporting lower bearing.

It is common practice in chemical processing plants and in food processing establishments to employ mixing vessels in which an agitator assembly is supported with the shaft extending downwardly into the liquid contents of the tank, the shaft carrying agitator blades or equivalent elements for agitating or stirring the contents of the tank. These "top-mounted" agitators are often used in conjunction with the processing of corrosive or abrasive fluids. Under such circumstances it is a common practice to install cantilevered agitators, which are supported only at the shaft end exterior of the vessel itself.

Agitators of the type described are subject to shaft failures and to failures in coupling devices used. Additionally, such agitators undergo premature bearing failures as well as failures in gear assemblies and in speed-regulating gear boxes used in conjunction with the drive assembly. Still other difficulties with agitators of this general type is that one must impose substantial limitations on the rotational rates (rpm) and upon the number and configuration of the agitating blades. Inherent in the use of such cantilevered agitators is that the overall height or depth of the tank is limited. At the same time, the liquid level in the tank itself must be maintained so as to ensure the agitator centering ring to be immersed in the fluid level.

It is, accordingly, a principal aim of the present invention to provide an apparatus and technique whereby the above and other shortcomings and inadequacies of cantilevered agitators are obviated.

SUMMARY OF THE INVENTION

The present invention is directed to an apparatus rendering it possible to invoke benefits inherent in supporting an agitator shaft at that end remote from a driving or impelling motor or mechanism. The present invention provides a baffle for protecting a bottom bearing assembly used as a stablizer for an agitator shaft operating in a tank-like vessel containing a liquid hostile to bearing components. The baffle defines or establishes a pressurized chamber for isolating the bearing from the liquid in the vessel. Gas under pressure delivered to the chamber prevents invasive entry of the liquid from the vessel itself.

It is a principal feature of the invention that it provides a simple and effective structure by means of which an anti-friction bearing may be installed at or near the bottom of a tank, below the liquid level, for supporting and stabilizing an agitator shaft.

An important advantage of the bearing assembly of the invention is that it deals effectively in situations in which contents of the tank may tend to solidify on agitator blades producing an imbalance in the shaft. Such imbalance ordinarily causes the shaft to wobble and to move off center creating a large moment arm (proportional to the length of the shaft), resulting in mechanical failures. The bottom bearing assembly of the invention eliminates the large moment arm and greatly reduces the stresses generated.

It is a related feature of the invention that the diameter of the agitator shaft can be signficantly reduced since the stresses causing fatigue breakage are essentially eliminated.

Yet another feature of the invention is that it significantly reduces coupling failures in the shaft securement mechanisms.

It is an advantage of the present invention that it essentially eliminates bearing and gear failure in gear box or shaft drive and speed control mechanisms.

Yet another feature of the invention is that it enables one to size the agitator blades and to regulate the number of these blades for optimum process efficiency without the constraints of cantilevered design limitations.

A related advantage of the invention is that the tank height in which the agitator is employed can be sized for optimum process efficiency, again without cantilevered design limitations.

A feature contributing to the efficiency of the operation is that, through the use of the present invention, the liquid level in the tank can be operated to the full tank capacity, or drawn down to a point that the agitator blades can be uncovered without harm.

It is a feature of the invention that there is provided a bearing holder which is firmly secured to the bottom wall of the tank to preclude radial displacement of the lower end of the agitator drive shaft.

The baffle of the invention is characterized in that it establishes a pressurized trapped air cavity or chamber in communication with and enveloping the shaft-stabilizing bearing. The pressurized gas prevents tank fluid from entering the cavity to contact the bearing itself. The baffle of the invention provides, in combination, a caisson-like tube secured to the bottom wall of the vessel. The tube, open at its upper end, is oversleeved with a pipe-like inverted bucket which is fastened in turn to for rotation with the agitator shaft so that the only "frictional" engagement between the lower portion of the shaft and the stabilizing assembly is through the bearing itself.

In a preferred embodiment of the invention the baffle cavity or chamber which surrounds and protects the bearing of the assembly is fed with volume-regulated oil-laden input air.

It is a feature of the invention that pressure is controlled only by the liquid level and its specific gravity. Minimum pressure need be only slightly higher than that produced by the maximum height and specific gravity likely to be encountered.

Volume need be controlled only to prevent waste of gas/air. After initial fill of the chamber, the only gas/air make-up required is for what little is absorbed into the liquid or required for an increase in liquid level or specific gravity. All excess air bubbles rise to the top.

It is a practical feature of a preferred embodiment of the invention that the bearing assembly may be preattached to the end of the agitator shaft prior to insertion into the mixing vessel. It is then required merely to secure mounting flanges to a tubular base sealed to the bottom of the vessel itself. Suitable gaskets are utilized to ensure fluid-tight couplings.

Other and further objects, features and advantages of the invention will be evident from the following detailed description considered in conjunction with the drawings.

THE DRAWINGS

FIG. 1 is a schematic representation, partly in section, illustrating a vessel with an agitator and including a bottom bearing assembly incorporating a baffle for protecting the bearing from fluid in the vessel, in accordance with the present invention; and FIG. 2 is a cross-sectional view, somewhat enlarged, taken substantially on the lines 2—2 of FIG. 1.

DETAILED DESCRIPTION OF THE PREFERRED EMBODIMENT

The aims, objects and advantages of the invention are achieved by providing, in conjunction with an agitator assembly of the type extending downwardly into a tank-like vessel, a bottom bearing assembly for stabilizing the agitator shaft and including a baffle for preventing fluid in the tank or vessel from coming into contact with the bearing components. It is a critical feature of the invention that there is provided a pressurized chamber which envelopes the bearing itself and which isolates the bearing from the liquid in the vessel. The chamber is maintained free of invasive liquid from the reaction or mixing vessel by means of gas which is delivered into the chamber under sufficient pressure to prevent invasive entry of liquid. Thus, the bearing itself operates in a gaseous medium which is free from contamination by liquid present in the mixing vessel.

In a preferred embodiment of the invention the protective chamber is achieved through the use of sleeved overlapping tubular elements, a lower such element being sealed to and projecting upwardly of the bottom wall of the vessel, and an upper element being sealed to the rotating shaft of the agitator and sleevedly overlapping the upwardly extending lower tubular element. Pressurized gas is introduced into the assembly at the base of the lower element and is ultimately discharged, at a regulated rate, through an annular channel delineated by coextensive wall portions of the upper and lower tubular elements.

Referring now to the drawing, there is shown for illustrative purposes and not in any limiting sense, one preferred embodiment of the baffle for protecting a bottom bearing assembly, and incorporating the features of the invention. The assembly itself is depicted in conjunction with a reactor vessel or mixing vessel, the latter not constituting, per se, an element of the present invention. It will be appreciated that the invention itself finds utility, generally, in a broad class of vessels or reactors, and that practice of the invention is not dependent upon or keyed to any particular type of vessel except that the vessel is generally one in which the agitator is inserted at the upper end to project downwardly into the interior. That is, the present invention is useful with all vessels in which the agitator includes an elongated shaft projecting downwardly from an upper zone of the vessel to the interior. For purposes of providing a complete explanation of the utility of the invention there is shown a motor drive and speed reducing assembly for controlling the revolution speed of the agitator shaft. Again, none of these elements is, per se, a component of the present invention. The elements described are included purely to establish the type of environment in which the invention finds utility.

In the specific example illustrated in FIG. 1 there is shown a vessel or tank 20 having a bottom wall 24 and a sidewall 28, and defining a chamber 30 for containing a liquid 32. While the tank 20 may be of any preferred cross-sectional configuration, a generally cylindrical tank is preferred. A beam 34 supported on framing members or stanchions 36 and 38 bridges the tank 20 at its upper end and supports an electric motor drive 40 mechanically coupled by means of a connecting shaft 44 to a gear box or speed reducing or increasing component 50.

Connected to an output coupling 54 and projecting downwardly and into the chamber 30 of the vessel 20 is an agitator shaft 60 to which is secured at 62 for rotation therewith, an agitator blade or impeller 64. The above described structure and functional components are more or less conventional and do not constitute, per se, elements of the invention. Rather, and as illustrated in the lower portion of FIG. 1, the invention pertains to a baffle assembly 70 provided to protect a bottom bearing assembly 74 from the liquid 32 contained in the vessel 20, all as described more fully herebelow.

As shown, the agitator shaft 60 extends well beyond the point of attachment 62 of the propeller 64, and that end 78 of the shaft remote from the upper driven end 80 is engaged within a bearing 84. In the particular embodiment of the invention illustrated, the bearing 84 is secured within a cylindrical bearing holder 88 which is open at its lower end 90 and terminates at its upper open end in a radially outwardly directed annular flange 94. The flange 94 and the bearing holder 88 depending therefrom are supported in turn on a collar 98 which surmounts a cylindrical casing 102 welded at 104 or otherwise fastened in fluid-tight engagement to the floor 24 of the vessel 20.

Extending to project upwardly of the cylindrical bearing holder 88 as a coaxial extension therefrom is a cylindrical tube 106 open at each end and terminating at its lower end in a radially outwardly extending circumscribing flange 110 overlying and supported on the flange 94 of the bearing holder 88. In the specific embodiment of the invention illustrated, gaskets 114 and 116 are interposed, respectively, between the collar 98 and the holder flange 94 and between the holder flange 94 and the tube flange 110. Nut 120 and bolt 124 assemblies engage, through cooperating aligned openings in the collar 98 and the overlying flanges 94 and 110 to secure the composite assembly firmly in place.

Referring now further to the baffle assembly 70 (FIG. 1), a pipe or an inverted bucket-like structure 128 open at its lower end 130 includes a top transverse wall 132 sealed at 134 to the agitator shaft 60 to provide a fluid-tight connection therewith. The pipe 128 is sized radially so as telescopically to sleeve over the tube 106 to provide a longitudinally extending restricted annular channel 138 through which air (or an inert gas) introduced into the chamber 140 is ultimately released, at the lower open end 142 of the channel 138, all as indicated schematically in FIG. 1.

Extending through the floor 24 of the vessel 20 in a zone 150 delineated by the casing 102 is a gas input conduit 54 sealed at 156 into to extend through the floor 150. A pump 160 connected to a pressure tank 164 delivers pressurized air or a selectable inert gas through a line 168 and a volume regulator 172 to the input conduit 154 to provide gas under pressure to fill the cavity defined by and bounded by the casing 102, its essential extension, the tube 106, and the over-sleeved pipe or inverted bucket 128.

Based upon the foregoing description and considering the operational feature of the invention, it will be understood that the bearing 84 is provided with suitable through axial ports (FIG. 2) 180 which provide gas flow communication between the entry chamber 140 and the major chamber 184 of the baffle 70 of the invention. Thus, pressurized gas introduced into the cavity 140 through the delivery conduit 154 completely fills the entire baffle assembly and, finally, is controllably discharged through the annular channel 138 to exit through the port 142 thus preventing the entry of fluid into the zone occupied by the bearing 84.

While the foregoing description of the invention has been made with reference to a preferred embodiment, persons skilled in the art will understand, in the light of the present disclosure, that numerous changes, modifications, and alterations may be made therein without departing from the spirit and scope of the appended claims.

What is claimed is:

1. The combination with a vessel having a bottom wall and a circumscribing sidewall extending upwardly therefrom to define a mixing chamber, and including a mixer assembly for agitating fluids contained in said mixing chamber of said vessel, a rotatable shaft of said mixer assembly extending into said mixing chamber of said vessel, means for supporting said rotatable shaft for projecting into said chamber, agitator blade means carried by said shaft and secured thereto for rotation therewith within said vessel to agitate fluid contained in said mixing chamber, drive means and means coupling said drive means to said shaft for effecting rotation thereof and of said agitator blade means carried thereby, bearing means engaging said shaft and means securing said bearing means within said vessel for stabilizing said shaft at a rotatable end section thereof remote from said drive means and below a liquid level in said vessel and for preventing objectionable vibration of said shaft correlated with excessive radial displacement of said shaft during rotation thereof within said vessel, baffle means for preventing liquid in said vessel from contacting said bearing means, said baffle means including a casing open at a top end thereof and having a base abutting and sealed to said bottom wall of said vessel in fluid-tight securement thereto, a cylindrical bearing holder sleeved within said casing and projecting downwardly therewithin and generally coaxially therewith, a tube open at each of opposed ends and projecting upwardly of said bearing holder and coaxial therewith, said casing including radially outwardly directed collar means extending therearound at an upper end thereof for attachment of said bearing holder and said tube thereto, radially outwardly extending first flange means carried by said bearing holder at an upper end thereof and overlying said collar means, second flange means carried by said tube at a lower end thereof and overlying said first flange means, fastener means for bolting said first and said second flange means to said collar means for support thereby, pipe means coaxial with said tube and sleeved therearound at an upper open end thereof, wall means extending radially between said agitator shaft and said pipe means and constituting a fluid-tight seal between said shaft and said pipe means at an upper end thereof, an interior transverse dimension of said pipe means being greater than an outer transverse dimension of said casing to provide a restricted annular channel therebetween, conduit means and means connecting said conduit means in fluid-flow communication with said vessel for delivering a regulated flow of pressurized gas into said casing for pressurizing said casing to prevent invasive entry of liquid from said vessel into said casing and to protect said bearing means from contact with liquid contained in said vessel.

2. The structure as set forth in claim 1 and further comprising first gasket means interposed between said first flange means and said collar means and second gasket means interposed between said first flange means and said second flange means for establishing fluid-tight seals at abutting interfaces thereof.

3. The structure as set forth in claim 1 wherein said means coupling said drive means to said shaft includes speed reducer means for reducing drive-means-derived rotational speed of said shaft.

4. The structure as set forth in claim 1 and further comprising pump means for directing pressurized gas through said conduit means and into said casing.

* * * * *